(12) United States Patent
Wang et al.

(10) Patent No.: US 7,385,669 B2
(45) Date of Patent: Jun. 10, 2008

(54) TWISTED NEMATIC MICROPOLARIZER AND ITS METHOD OF MANUFACTURING

(75) Inventors: Zongkai Wang, Port Washington, NY (US); Shu Fang Han, New Hyde Park, NY (US); Adam W. Divelbiss, Wappingers Falls, NY (US); David C. Swift, Cortlandt Manor, NY (US)

(73) Assignee: Vrex, Inc., Hawthorne, NY (US)

( * ) Notice: Subject to any disclaimer, the term of this patent is extended or adjusted under 35 U.S.C. 154(b) by 403 days.

(21) Appl. No.: 11/085,833

(22) Filed: Mar. 21, 2005

(65) Prior Publication Data
US 2005/0247958 A1 Nov. 10, 2005

Related U.S. Application Data

(63) Continuation-in-part of application No. 10/045,871, filed on Jan. 14, 2002, now abandoned.

(51) Int. Cl.
*G02F 1/13* (2006.01)
(52) U.S. Cl. ............. 349/194; 349/187; 349/96; 359/483
(58) Field of Classification Search ............. 349/96, 349/187, 93, 94, 99, 101, 158, 179, 177, 349/183, 186, 188, 194, 103, 123, 86, 88, 349/117; 438/30; 359/63, 36, 483, 66; 345/87; 362/19
See application file for complete search history.

(56) References Cited
U.S. PATENT DOCUMENTS
5,327,285 A * 7/1994 Faris .................... 359/483

5,691,789 A 11/1997 Li et al. .................... 349/98

(Continued)

FOREIGN PATENT DOCUMENTS
GB 2326727 A 12/1998

(Continued)

OTHER PUBLICATIONS

Broer, DJ, "Creation of Supramolecular Thin Film Architectures With Liquid-Crystalline Networks," 15th International Liquid Crystal Conference, Budapest, Hungary, vol. 261, pp. 513-523, Jul. 3-8, 1994; Molecular Crystals and Liquid Crystals, Gordon & Breach, Switzerland, pp. 513-517, 1995.

(Continued)

*Primary Examiner*—Thoi V. Duong

(57) ABSTRACT

The invention is a method for creating a micropolarizer, including providing a first plate having a first and a second surface, providing a second plate having a first and a second surface. Then coating a polyimide on each of the first surface of the two plates followed by rubbing the polyimide coated upon the first surface of the first plate along a predetermined direction and rubbing the polyimide coated upon the first surface of the second plate along a direction having a predetermined angle in relation to the predetermined direction. An alignment process includes aligning the first plate and the second plate having the first surface of the first plate and the first surface of the second plate facing each other thereby creating a space there between. In conclusion there is a filling of a liquid crystal material in the space whereby a cell, or film is created.

10 Claims, 18 Drawing Sheets

TN-Micropol Made Using a Flexible Linear Polarizing Sheet as One Substrate and a Non-Birefringent Sheet as the Other Substrate.

U.S. PATENT DOCUMENTS

| | | | |
|---|---|---|---|
| 5,844,717 A | 12/1998 | Faris | 359/483 |
| 5,894,361 A | 4/1999 | Yamazaki et al. | 349/15 |
| 5,959,707 A | 9/1999 | Murai et al. | 349/129 |
| 6,034,753 A | 3/2000 | Li et al. | 349/98 |
| 6,074,708 A * | 6/2000 | Onishi et al. | 428/1.1 |
| 6,133,980 A | 10/2000 | Faris | 349/176 |
| 6,181,395 B1 | 1/2001 | Li et al. | 349/98 |
| 6,404,472 B1 | 6/2002 | Andreatta et al. | 349/123 |
| 2001/0003473 A1 | 6/2001 | Galabova et al. | 349/98 |

FOREIGN PATENT DOCUMENTS

| WO | WO97/16762 A | 5/1997 |
|---|---|---|
| WO | WO98/20391 A | 5/1998 |

OTHER PUBLICATIONS

Davis, G.M., "Liquid Crystal Polymer Thin Film Anisotropic Optical Components," Shapu/Giho/Sharp Technical Journal, Sharp Co., Nara-Ken, JP, vol. 63, No. 12, pp. 22-25, Dec. 1, 1995.

Mauer R et al., "Cholesteric Reflectors with a Color Pattern," SID International Symposium Digest of Technical Papers, vol. 25, pp. 399-402, Jun. 14-16, 1994.

* cited by examiner

Fig.1. Schematic illustration of a PVA retarder based uPol

Fig.2. Optical rotation by a TN liquid crystal cell

Fig. 3 Transmittances of PVA film and TN cell with wavelength

Fig.4. Schematic illustration of a TN based uPol

Fig.5. TN based uPol made with the UV mask method

Fig.6. TN based uPol made with the E-field alignment method

Fig.7. TN based uPol made with the multi-rubbing alignment method

Fig. 8 TN uPol with 260um line width made by two-step UV exposure method

Fig. 9 TN uPol with 60um line width made by Multiple-Rubbing Method

Figure 10. TN-Micropol Made Using a Flexible Linear Polarizing Sheet as One Substrate and a Non-Birefringent Sheet as the Other Substrate.

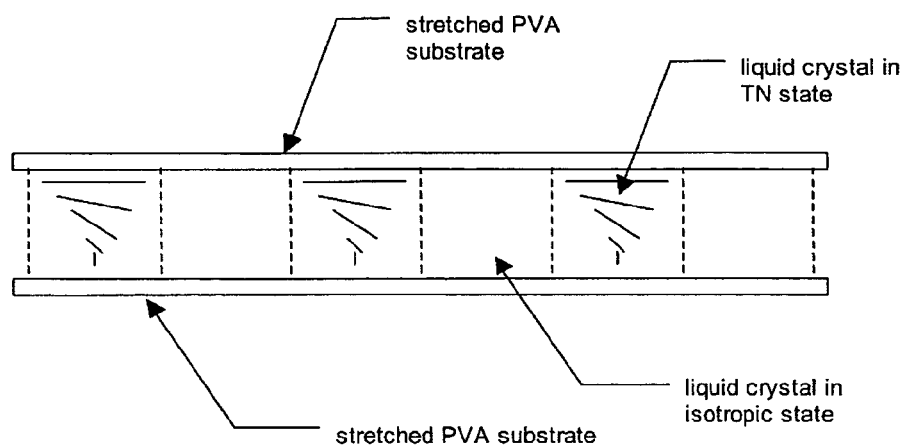
Figure 12, TN-Micropol fabricated using two stretched PVA substrates instead of glass using the two-step UV exposure method

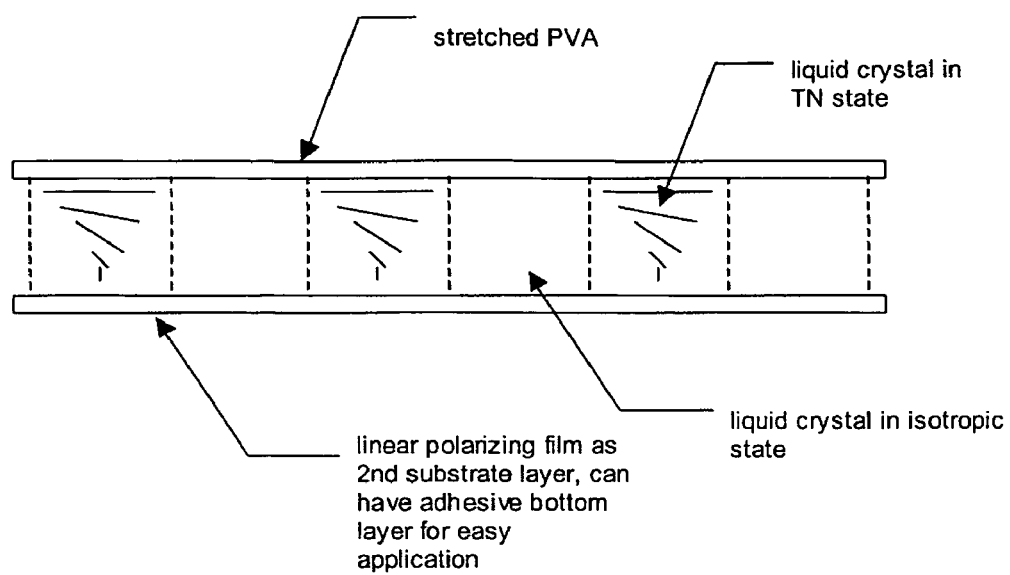
Figure 13. TN-Micropol Made Using a Flexible Linear Polarizing Sheet as One Substrate and a Non-Birefringent Sheet as the Other Substrate.

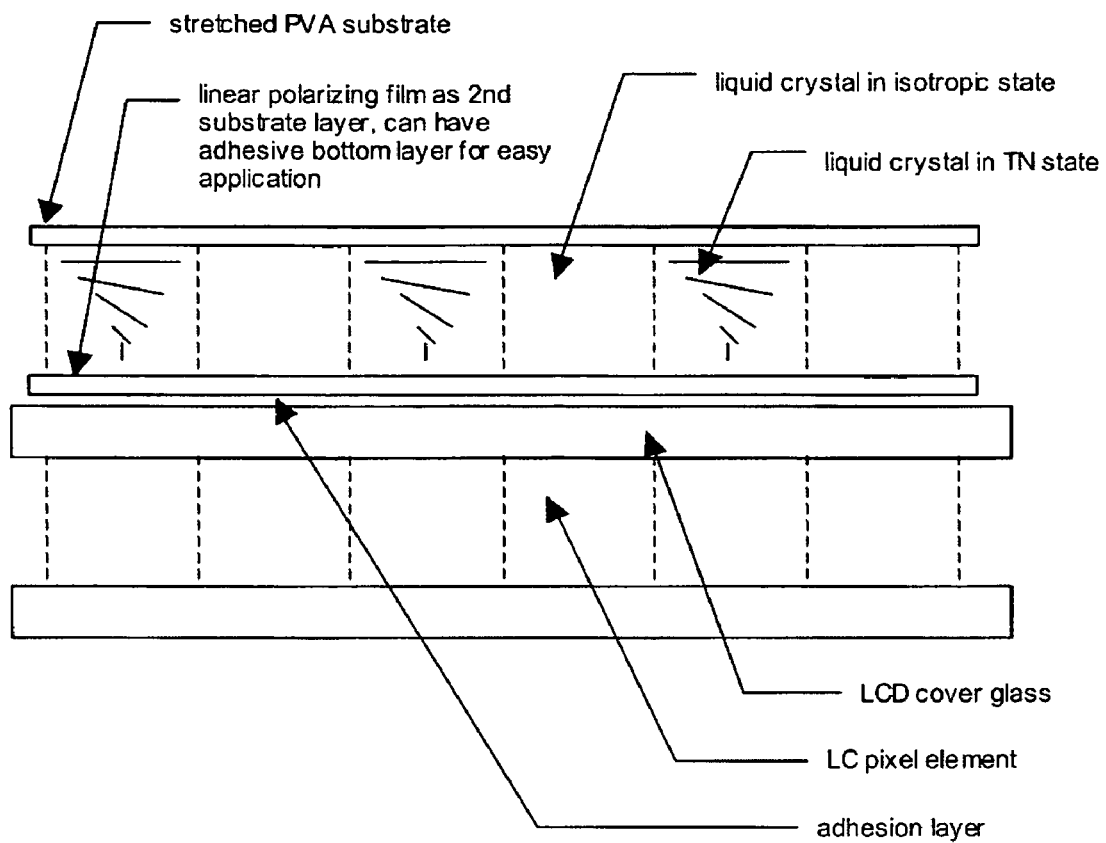
Figure 14. Improved TN-Micropol Fabricated Directly on LC Display

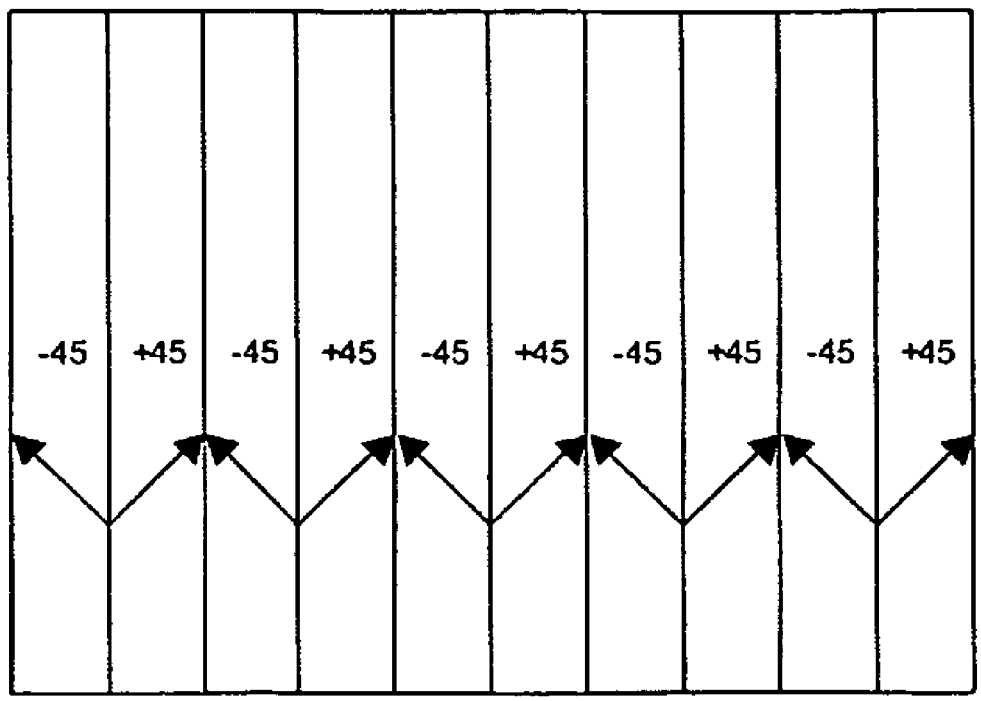
Figure 15 - 45-Degree Micropol

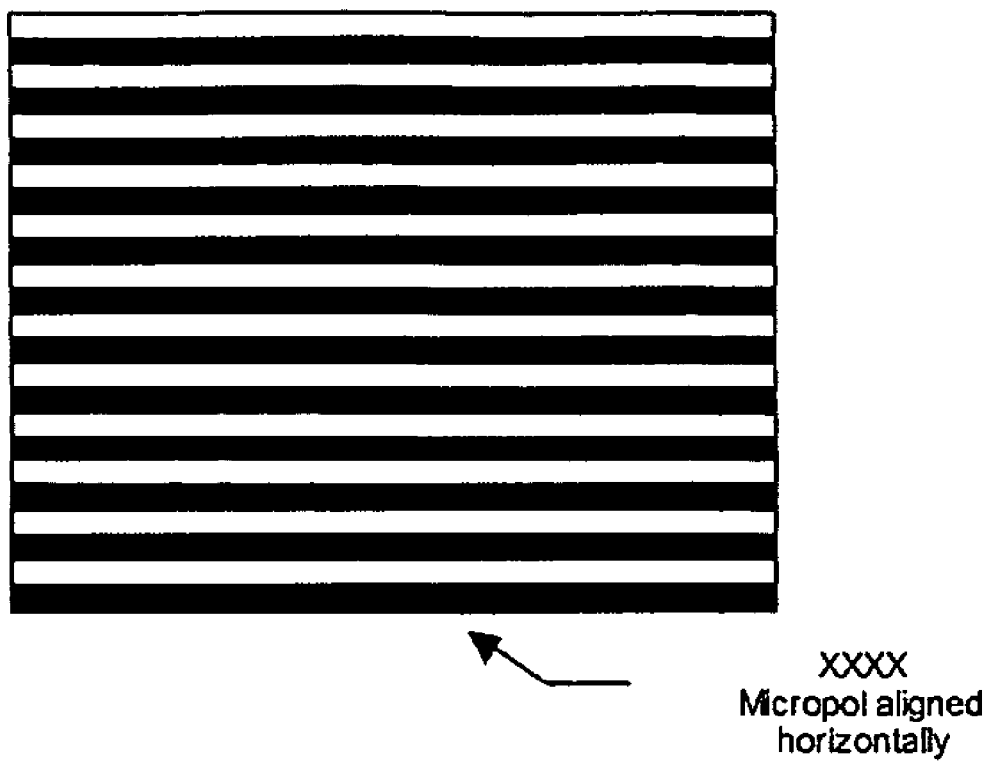
Figure 16 - Horizontally Aligned TN-Micropol

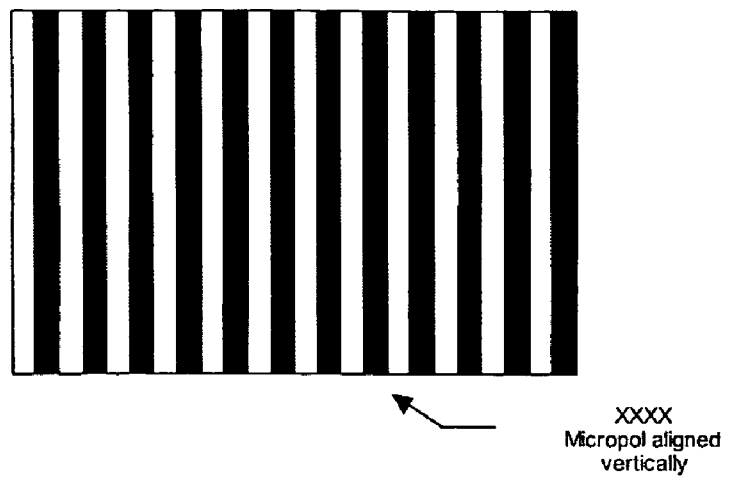
Figure 17 Vertically Aligned TN-Micropol for Vertical Display Pixel or Sub-Pixel Columns

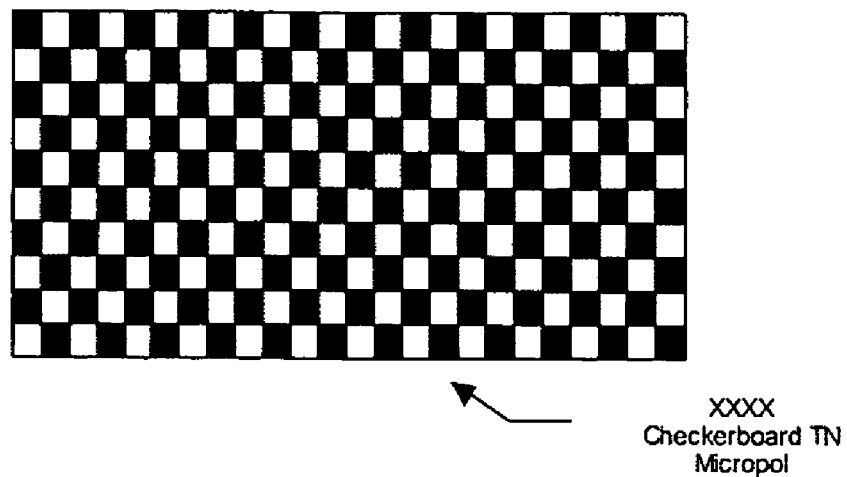
Figure 18 - Checkerboard TN-Micropol Aligned Vertically and Horizontally

TWISTED NEMATIC MICROPOLARIZER AND ITS METHOD OF MANUFACTURING

CROSS REFERENCE TO RELATED APPLICATIONS

This application is a Continuation-in-Part of Non-provisional application Ser. No. 10/045,871 ('871) filed Jan. 14, 2002 now abandoned by Faris et al. and is hereby incorporated by reference.

BACKGROUND OF THE INVENTION

This disclosure is related to the development and the improved manufacturing of micropolarizers (μPol™) (micropol) based on twisted nematic (TN) liquid crystals. VRex, Inc. and Reveo, Inc., the assignee of this application and its parent have several patents and patent applications with regard to the micropol. These prior art documents describe several forms that the micropol may take (including alternating rows, alternating columns and checkerboard configurations), various substances that may be used to make them (polyvinyl alcohol, and various types of liquid crystal), and various methods for fabrication. Many of these methods have shown great promise for manufacturing and are, in fact, presently in use. These patents include U.S. Pat. No. 5,096,520 ('520) issued on Mar. 17, 1992 to Faris; U.S. Pat. No. 5,327,285 ('285) issued on Jul. 5, 1994 to Faris; U.S. Pat. No. 5,537,144 ('144) issued Jul. 16, 1996; U.S. Pat. No. 5,844,717 issued on Dec. 1, 1998; and U.S. Pat. No. 6,384,971 issued on May 7, 2002 to Faris.

Micropol (μPol) panels in which patterned polarizers having alternate lines of perpendicular polarization are used in conjunction with polarizing glasses. In this technique, polyvinyl alcohol (PVA) λ/2 retarder has been the base for building the μPol array. The fundamentals of this μPol rely on the π phase shift induced by PVA. The μPol 100 is built in such a way that it consists of alternately spaced lines with 102 and without 104 the π phase shifter, as schematically shown in FIG. 1.

The advantages of such a μPol include:

Simple processing;

Low cost;

High throughput;

The PVA based μPol, however, has its own shortcomings:

Poor spectral characteristics due to the phase shift mechanism;

Relatively thicker film thickness;

Relatively low spatial resolution;

Difficulty in line width control;

Poor thermal and humidity resistance.

There is room for improvement in developing new fabrication methods that can reduce the cost and the time involved in the manufacturing process itself and in the application of the micropol to flat panel LCD displays or other flat rasterized display devices.

The purpose of this invention is to improve the processes of micropol fabrication and application, particularly for the TN-micropol described in the '871 TN-micropol patent application This invention describes alternative methods to manufacture a high quality μPol that will essentially eliminate all the above-mentioned problems at a lower cost.

BRIEF SUMMARY OF THE INVENTION

The invention is a method for creating a micropolarizer, including providing a first plate having a first and a second surface, providing a second plate having a first and a second surface. Then coating a polyimide on each of the first surface of the two plates followed by rubbing the polyimide coated upon the first surface of the first plate along a predetermined direction and rubbing the polyimide coated upon the first surface of the second plate along a direction having a predetermined angle in relation to the predetermined direction. An alignment process includes aligning the first plate and the second plate having the first surface of the first plate and the first surface of the second plate facing each other thereby creating a space there between. In conclusion there is a filling of a liquid crystal between the spaces whereby a cell, or film is created.

The method for creating a micropolarizer includes providing a material having a first and a second surface and then cleaning the material by 2-propanol in an ultrasonic tank for 30 seconds. Spacers are sprayed on a first surface of the material. A cell is made using tow sheets of the material in such a way that a stretching direction of one sheet is orthogonal to the other. Polymerizable twisted nematic LC (TNLC) material is placed between the sheets. The cell is covered with a micropolarizer pattern mask. The horizontal rows are oriented 45° with respect to the stretching direction of the original material. The cell and mask are put into a pressing machine to make said cell and said mask closed completely. Care is made to control a thickness of the cell. The TNLC under the transparent area is polymerized with UV light into a permanent TN texture. The mask is removed. The cell is heated higher than a nematic-isotropic transition temperature so that unpolymerized LC covered by opaque strips of said mask experience a transition into an isotropic phase. UV light is used to polymerize uncured LC material at isotropic phase. Various materials are used as the covering material of the micropolarizers, including stretched PVA film, a linear polarizer and non-birefringent plastic film.

BRIEF DESCRIPTION OF THE DRAWINGS

These and other features, aspects, and advantages of the present invention will become better understood with regard to the following description, appended claims, and accompanying drawings where:

FIG. 12 illustrates a checkerboard TN-micropol aligned vertically and horizontally;

FIG. 13 illustrates a TN-Micropol using two stretched PVA substrates instead of glass using the two-step UV exposure method;

FIG. 14 illustrates a TN-Micropol using a linear polarizing sheet as one substrate and a Non-Birefringent sheet as the other substrate; and FIG. 15 illustrates an improved TN-Micropol directly on a LCD display; and FIG. 16 illustrates a 45-Degree micropol;

FIG. 17 illustrates a horizontally aligned TN-micropol;

FIG. 18 illustrates a vertically aligned TN-micropol for vertical display pixel or sub-pixel columns.

DETAILED DESCRIPTION OF THE INVENTION

Principals of TN Liquid Crystal

Figure 1:
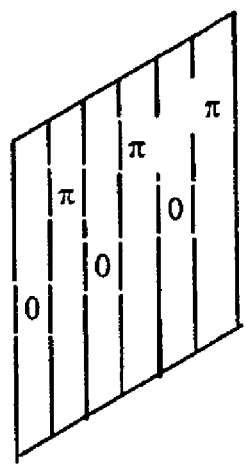
FIG. 1 illustrates a schematic of a PVA retarder based on μPol technology.
Figure 2:
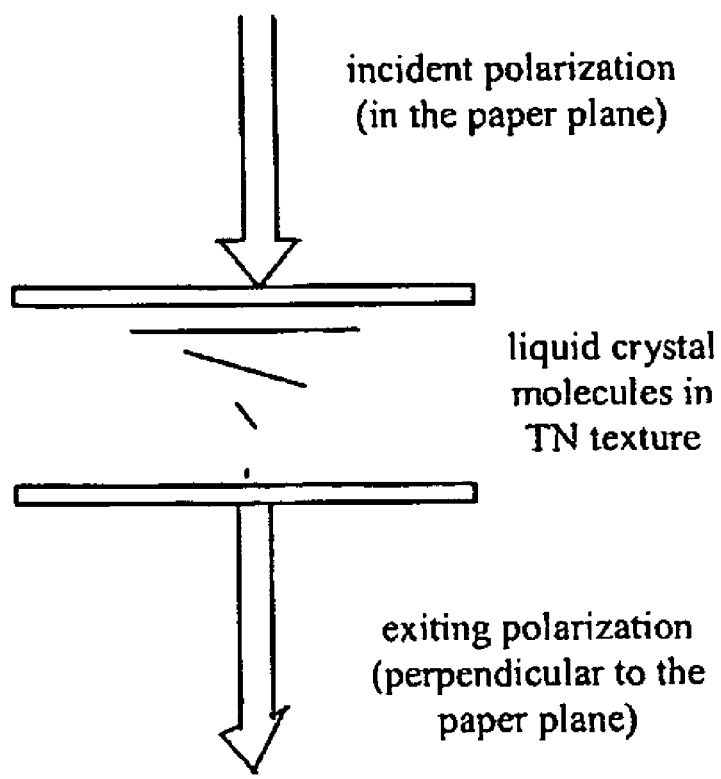
FIG. 2 illustrates optical rotation by a TN liquid crystal cell.

When twisted nematic (TN) cells 200 satisfy the Mauguin condition, the incident linearly polarized light 202 can be considered to rotate with the liquid crystal molecules. For a 90° TN cell, the Mauguin condition is $2\Delta nd >> \lambda$, in which d is the cell thickness; $\lambda$ is wavelength of incident light and $\Delta n$ is birefringence, respectively. A TN film 204 rotates the polarization axis of linear incident light by 90° 206, as shown in FIG. 2.

Figure 3:
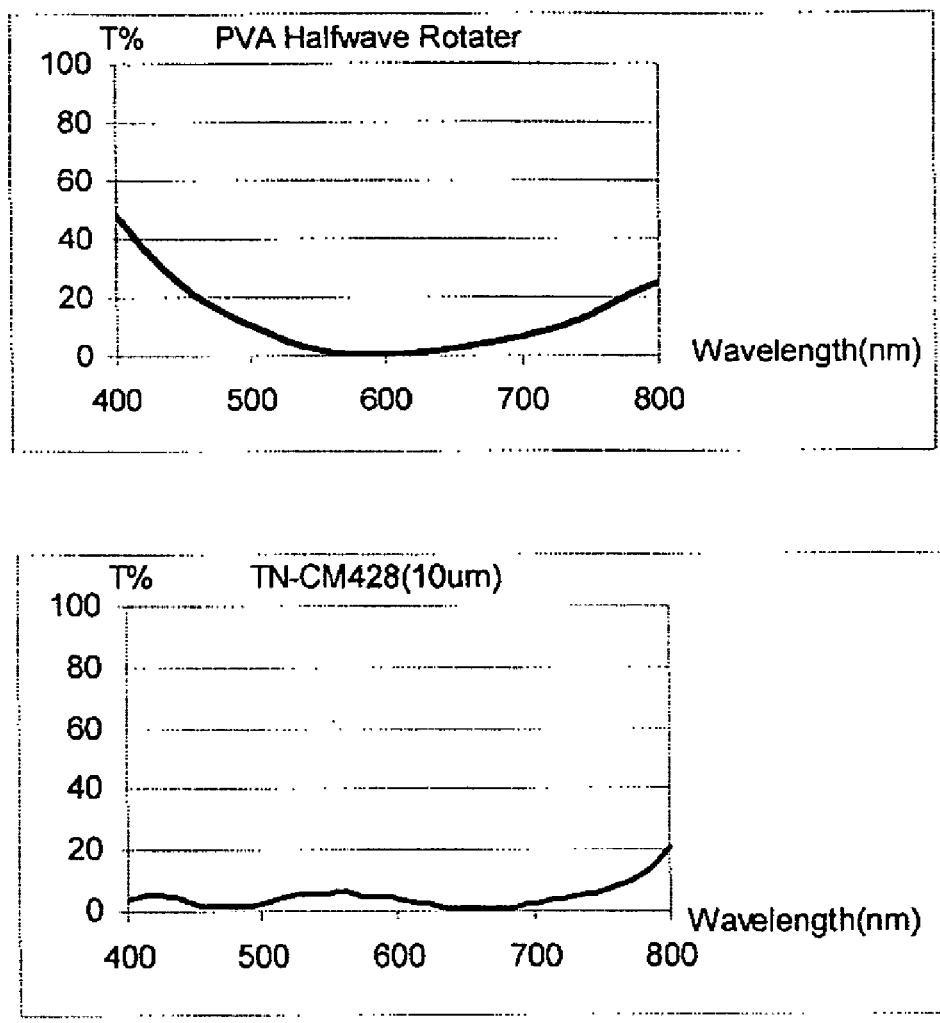
FIG. 3 illustrates the transmittance of PVA films and TN cell versus wavelength.

In a 90° TN cell, liquid crystal molecules are oriented in such a way that the top layer is aligned in one direction while the bottom layer is perpendicularly aligned. The optical rotation by the TN cell exhibits much less wavelength dependence than that of a $\lambda/2$ retarder. In other words, the bandwidth of a TN cell 300 is much wider than that of a retarder, as shown in FIG. 3. FIG. 3 shows the transmittance curves of PVA 302 film and a TN cell 304 as a function of the wavelength, in which the transmittance measurement was taken by inserting the PVA film and the TN cell between pairs of parallel polarizers. The thickness of TN cell is 10 μm and polymerizable liquid crystal CM428 is used and cured by UV light.

The TN film can be made relatively thin, typically, in the range of 5μ, as compared to 37.5μ of a commercial retarder from Polaroid. Such a thin layer is most suitable for constructing a high-resolution μPol. Generally, liquid crystal materials used in display systems have excellent thermal as well as humidity resistance. Furthermore, if the TN cell is built with polymerizable (UV curable) liquid crystal, it can be peeled off from the glass substrates and can be transferred to other surfaces. TN μpol has the advantages of PVA μPol and overcomes the shortcomings of PVA μPol. The advantages of TN μPol are listed below:

Good spectral characteristics in the wide band;
Thin film thickness. By choosing large birefringence liquid crystal material, TN μPol film can be very thin and exhibit the wide bandwidth property.
Good spectral characteristics in the wide band;
High spatial resolution;
Small transition regions;
Easy to control line width;
Good thermal and humidity resistance;
Simple processing, low cost and high throughput.

TN Liquid Crystal Based μPol

Figure 4:
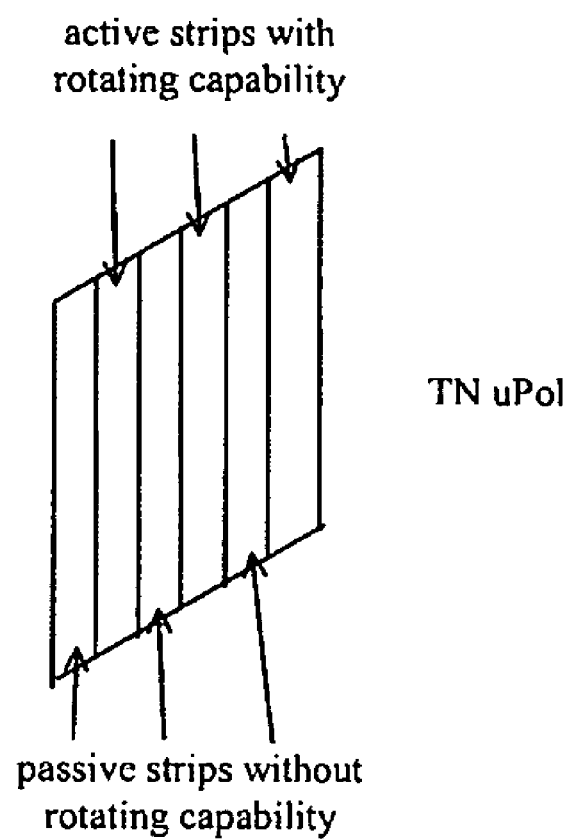
FIG. 4 illustrates a schematic of a TN based μPol.

If a TN film 400 is patterned to have alternatively spaced lines with 402 and without 404 the optical rotation capability, a new μPol is created, as shown in FIG. 4. In the active strips in FIG. 4, liquid crystal molecules are twisted so that they rotate the polarization angle of incident light. However, in the passive strips, molecules are un-twisted either in an isotropic phase or homogeneous or homeotropic phase so that they are unable to rotate the polarization.

TN μPol Processing

There are several ways to process a TN into a μPol. Four preliminary methods have been proposed in the '871 application. They are:
Two-step UV exposure;
E-field (electric field) alignment;
Multiple-rubbing; and
Photo-induced alignment.

The following sections describe the fundamental details regarding the four processing embodiments.

Two-Step UV Exposure Method

This method uses a two-step UV exposure procedure to create a μPol that consists of nematic lines in a twisted and an isotropic state, respectively. The method involves the following procedure:
Coat polyimide on two glass plates;
Rub the polyimide coatings;
Make a cell with the two plates in such a way that the polyimide rubbing direction of one plate is orthogonal to each other;
Fill in polyinerizable nematic liquid crystal with light chiral concentration so that a TN cell (film) is made;
Cover the TN cell with a mask which has an alternatively spaced opaque and transparent strips;
Using a UV light to polymerize the nematic liquid crystals under the transparent area into a permanent twisted texture;
Remove the mask;
Heat the cell higher than the nematic-isotropic transition temperature so that those un-polymerized nematics covered by the opaque mask strips experience a transition into the isotropic phase, resulting in un-twisting of the liquid crystal molecules. The twisting texture of the polymerized nematics remains un-changed.
Finally, re-polymerize the previously uncured nematics into isotropic phase.

Figure 5:
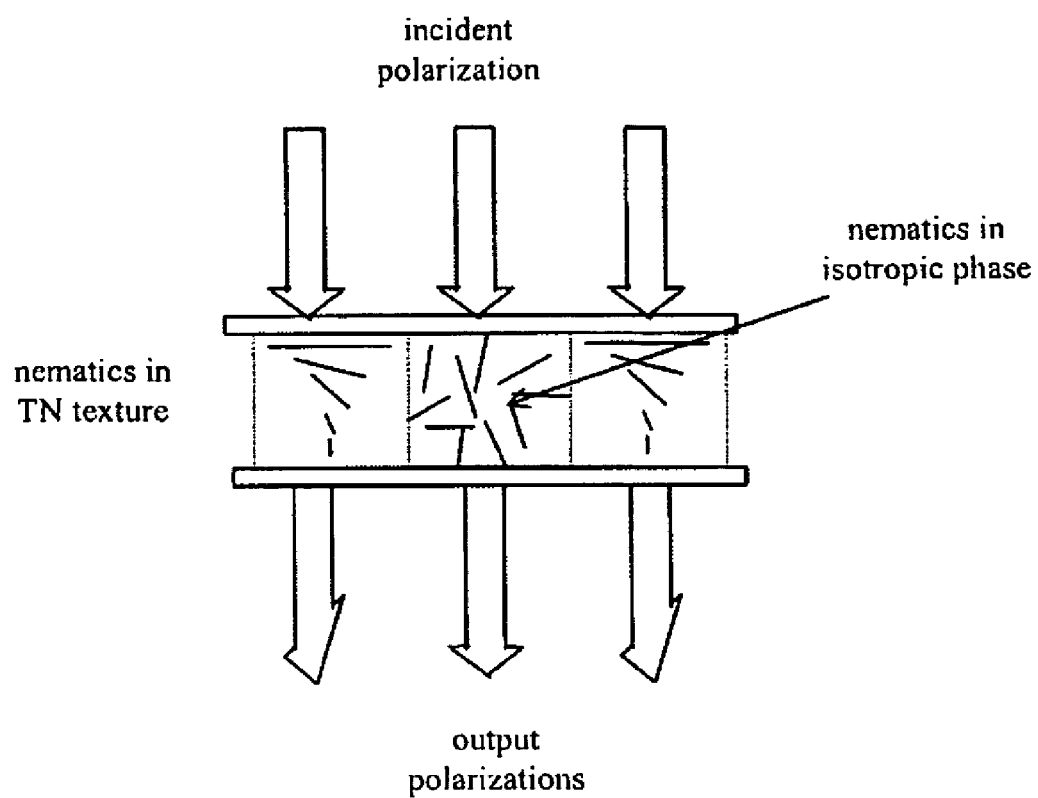
FIG. 5 illustrates a TN based μPol made with the UV mask method.

The resulting μPol will have the features as shown in FIG. 5. This method can only be realized using the polymerizable nematic liquid crystal.

E-Field (Electric Field) Alignment Method

In this method, an E-field is applied to a pre-patterned ITO electrode to create a μPol that contains nematic lines in twisted and homeotropic structure, respectively.

The detailed procedures involve the following procedure:
Using photolithography methods, pattern one ITO glass plate to have an alternatively spaced strips with and without ITO;
Coat polyimide on this patterned ITO glass and on another un-patterned ITO glass plate;
Rub the polyimide in the proper directions;
Make a TN cell with the two glass plates with rubbing directions perpendicular to each other;
Fill in nematic liquid crystal;
Apply an E-field to vertically align the nematic liquid crystal under the stripped ITO electrodes. The nematic liquid crystal under the strips without ITO remains in a TN texture.

Figure 6:
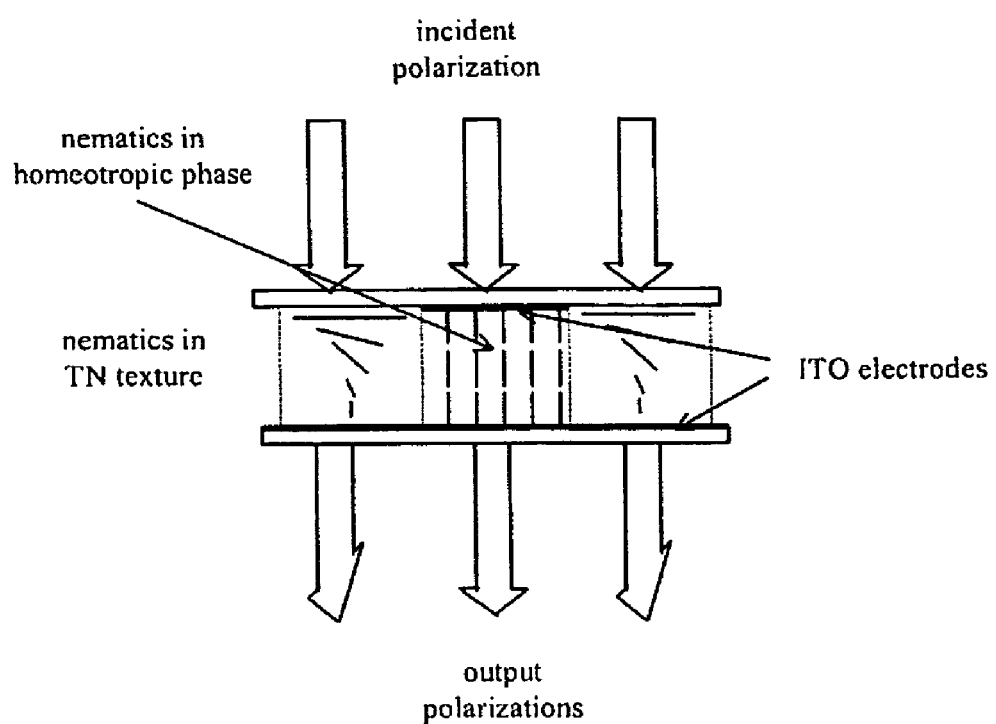
FIG. 6 illustrates TN based μPol made with the E-field alignment method.

The final texture of a μPol 600 constructed with this method is illustrated in FIG. 6.

Multiple-Rubbing Method

Patterned polyimide strips are created which have an orthogonal rubbing direction so that liquid crystals below one strip are aligned into a twisted texture while the nematics under adjacent strips are aligned into a homogeneous texture. A suitable polyimide must be used that the photolithography process will not ruin. This method is outlined in the following procedure.

Coat polyimide (SE 7311 from Brewer Scientific or other suitable polyimide) on one glass substrate;
Unidirectionally rub the polyimide coating;
Coat photo resist (S 1815 from Microposit or other suitable photo resist) on top of the rubbed polyimide;
Pattern the photo resist via photolithography to have alternating spaced strips;
Re-rub the polyimide left un-covered by the photo resist strips in a perpendicular direction to the first rubbing direction;
Remove all the photo resist by rinsing in an acetone bath;
Make a cell with the patterned glass plate and another unidirectionally rubbed polyimide glass plate;
Fill the cell with nematic liquid crystal to form a µPol with alternative strips in TN and homogenous texture.
If polymerizable liquid crystal is filled, cure the TN cell with a suitable UV light.

Figure 7:
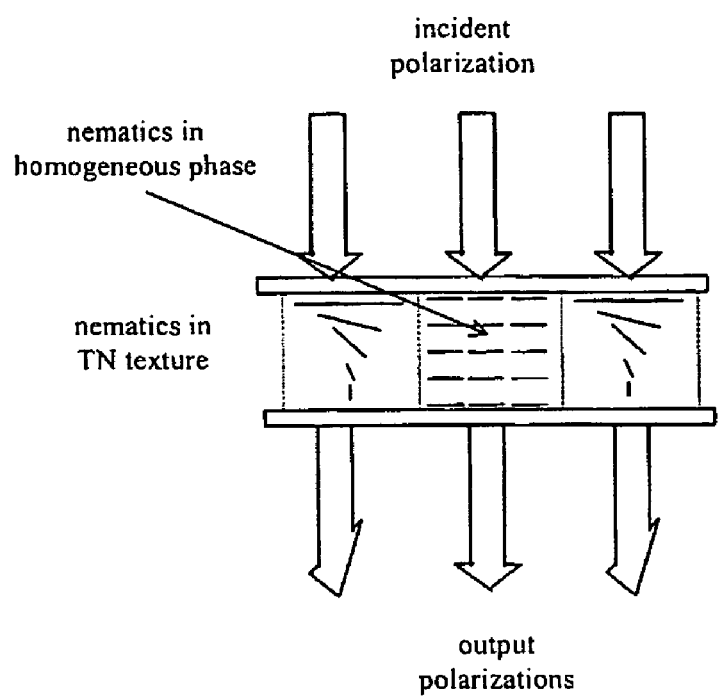
FIG. 7 illustrates a TN based μPol made with the multi-rubbing method.

The resulting µPol has the texture shown in FIG. 7.

Photo-Induced Alignment Method

Recently a great deal of attention has been paid to the possibility to align LC cells using photosensitive orientants. Because of its non-contact and easy to pattern properties, this method has some advantages over rubbed polymer films. Some materials, such as polyvinyl 4-methoxycinnamate (PVMC), polyvinylcinnamates (PVC), some polyimides, dyed polyimide, and azobenzene polymer, were found to have the capability to align liquid crystal molecules after exposure under linear polarization UV light. Liquid crystal molecules align in the direction perpendicular to the polarization direction of the UV light. There are several ways to realize a TN uPol by photo-induced alignment method that are described in detail below.

A. Two-Step Exposures with Linearly Polarized UV Light

For many of the photo-induced alignment materials mentioned above, when exposed to linearly polarized UV light in different direction of polarization for two times, they have a property that lets liquid crystal molecules align in the direction perpendicular to second exposure direction. Therefore, this property provides a very easy way to make TN uPol. The detail procedure given below:

Coat the suitable photo-induced alignment material (e.g. polyimide) onto two glass plates;
Bake following the instructions of the coating manufacturer;
Expose both plates to linearly polarized UV light at 1500 to 2000 mj/sq cm.
With the mask placed over the plate, expose one of the plates again under linearly polarized UV light with a polarization direction perpendicular to the initial polarization direction at 1500 to 2000 mj/sq cm.
Fabricate the cell and fill with the nematic liquid crystal.

For those materials that liquid crystal cannot align properly corresponding to a second exposure, a different procedure can be followed:

Coat the suitable photo-induced alignment material onto a two-glass plate bake.
Expose one plate to linearly polarized UV light at 1500 to 2000 mj/sq cm.
Expose another plate to linearly polarized UV light with the mask placed over the plate, move the mask half period precisely and then expose with linearly polarized (in a direction perpendicular to the initial polarization direction) UV light again.
Fabricate the cell and fill with the nematic liquid crystal.

B. Rubbine and Exposure with UV Linearly Polarized Light

In this method, rubbing processing and photo-induced alignment method are combined to produce TN µPol. The following details the procedure:

Coat the proper photo-induced alignment material on two glass plates followed by mechanical rubbing;
Pattern one of the glass substrate by shining it through a mask with a light polarized in parallel to the rubbing direction;
Make a cell with such a patterned glass plate and another uniformly rubbed polyimide plate;
Fill in twisted nematic material to form a µPol.

C. Bulk Alignment

In this method, the small amount of photoresist PVMC or azo dye is directly mixed into the nematic liquid crystal. When shined by a linearly polarized light, nematic molecules are perpendicularly aligned to the polarization direction. The following is the detailed procedure.

Coat polyimide onto two glass plates followed by rubbing;
Make a liquid crystal cell with the rubbed polyimide glass plates;
Fill in nematics;
Shine the cell through a mask with a linear light polarized perpendicularly to the rubbing direction to form a µpol.

The final texture of above µpol will be the same as shown in FIG. 7. Table I summarize the features of all the TN based uPol's made with the four methods described above, respectively.

TABLE I

Summary of the µPol's processed by the four methods

| Method | Recommended Application | Advantages | Disadvantages |
|---|---|---|---|
| Photo-mask | Will fit most applications | Simple processing No ITO glass Good thermal stability Low cost | Relatively low resolution |
| E-field | High-resolution applications. | High resolution Good thermal stability | Relative complicated procedure Possible birefringence by those nematics in homeotropic state. Need ITO glass LC must have Δε ≠ 0. |
| Multi-rubbing | High-resolution applications. | Relative high resolution No ITO glass Good thermal stability | Relatively complicated procedure Possible birefringence by those nematics in homogeneous state (ECB). |
| Photo-induced alignment | High-resolution applications. | Simple processing High resolution No ITO Good thermal stability | Possible birefringence by those nematics in homogeneous state (ECB). Dye must be outside the visible region. |

Pictures of TN uPol

Figure 8:
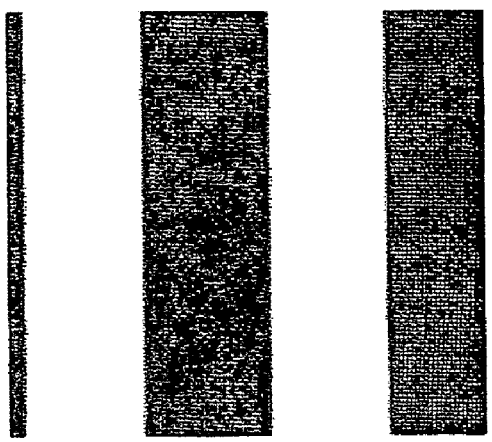
FIG. 8 illustrates a TN μPol with 260 μm line width made by two-step UV exposure method.
Figure 9:
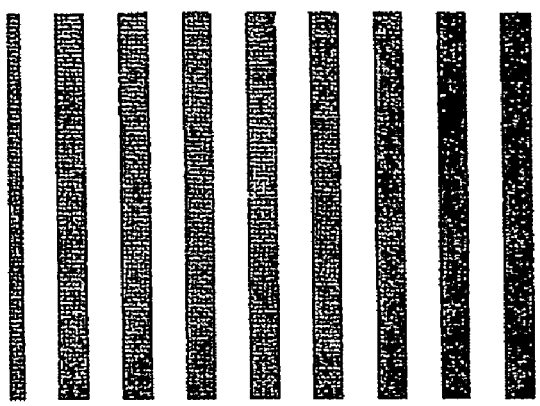
FIG. 9 illustrates a TN μPol with 60 μm line width made by Multiple-Rubbing Method.

Two TN uPol pictures are shown in FIGS. 8 and 9, which are observed with a crossed polarized microscope. FIG. 8 is a TN μPol 800 with 260 μm line width made by two-step UV exposure method. The white parts show TN texture 802 while the dark parts 804 express the isotropic phase of nematic. FIG. 9 is another TN μPol 900 with 60 um line width made by multiple-rubbing method. Similarly, the white parts 902 show TN structure but the dark parts 904 indicate homogenous alignment.

Using a Passive Linear Polarizer as the Substrate

Figure 10:
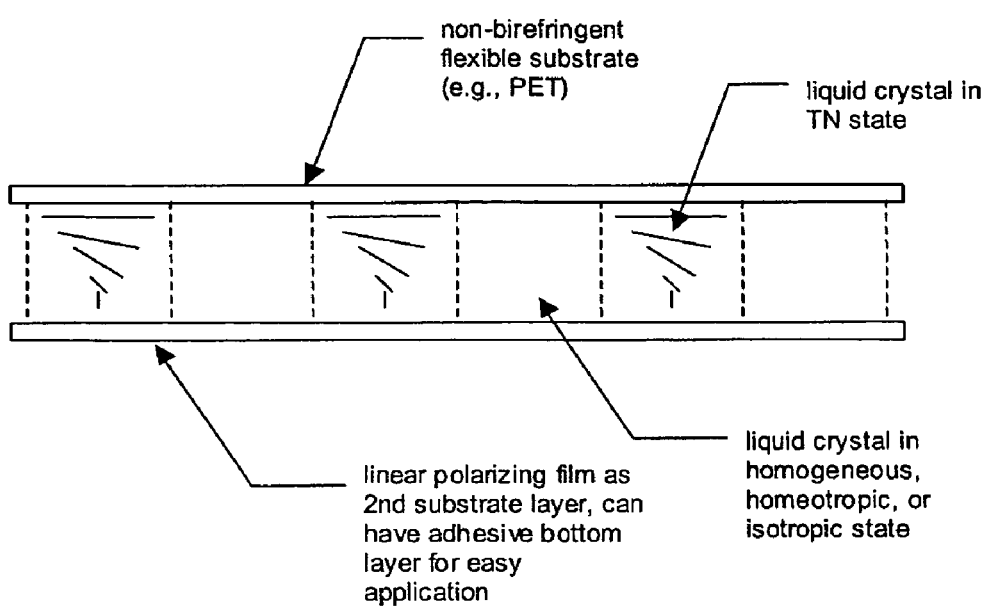
FIG. 10 illustrates a TN-μpol made using a flexible linear polarizing sheet as one substrate and a non-birefringent sheet as the other substrate.

The TN-micropol 1000 may also be constructed using a passive linear polarizer 1002 as one substrate of the patterned TN-liquid crystal cell and a non-birefringent layer 1004 as the second substrate as shown in the FIG. 10. Potentially each of the four methods described above for fabricating a TN-micropol can be used for this method. The resulting TN cell would be a flexible layered film that could be applied to a LCD display at the time of its manufacture. The process for construction of such a TN-micropol structure would depend on which of the four methods described above is chosen. FIG. 10 illustrates this construction method. The peelable version of the TN micropol can also be realized using this structure if polymerizable TN liquid crystal is used in the fabrication.

The advantage of this method is that TN-micropol can be fabricated in large sheets or rolls and adhered to the LC display and the time of its manufacture. This structure replaces the normal analyzer (polarizer used on the output of the display). Anti-glare measures can be used on the non-birefringent substrate of this micropol structure to reduce glare as is done on a regular LC display.

Fabricating a TN-Micropol Directly on the LCD

Figure 11:
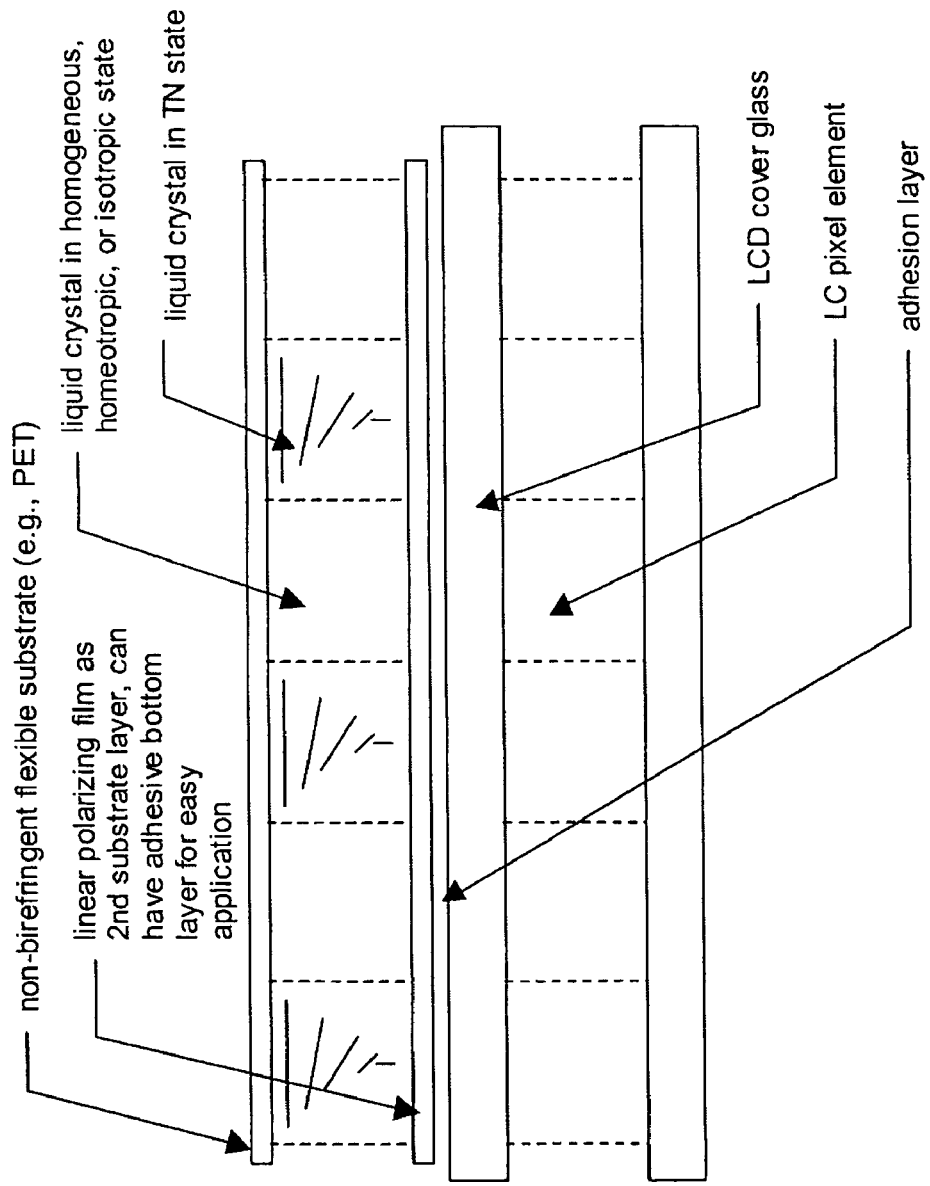
FIG. 11 illustrates a TN-μpol fabricated directly on an LC display.

An alternative to the previous method is fabrication of the TN-micropol directly on the LC display using the display itself as one substrate and a non-birefringent layer as the second substrate. As in the previous method, it is possible to use each of the fabrication methods (two-step UV exposure method, e-field alignment method, multiple rubbing direction method, and photo induced alignment method) to make the TN-micropol directly on the display. The advantage of this method is that the micropol can be accurately fabricated on the display as an additional step in the LC display manufacturing process. FIG. 11 illustrates this fabrication method.

TN-Micropol Fabrication Using Stretched PVA Substrates

The '871 TN-micropol patent application (parent of this application) also described the fabrication method (embodiment) called the "Two-step UV Exposure Method" as described above. In this method, the TN-micropol is fabricated using polymerizable liquid crystal between two glass substrates. The basic process involves constructing and filling an LC cell using the polymerizable liquid crystal. The cell is then heated to the clear point of the LC such that the LC transitions to the isotropic phase. A pattern mask is applied and W light is used to cure the exposed LC. The cell is then cooled until the unexposed LC returns to the twisted-nematic state and the mask is removed. After the cooling step UV light is applied again to cure the previously unexposed LC.

The LC cell used in the processes described above is constructed using two pieces of glass that are coated with polyimide and then rubbed to cause the LC molecules to align in the proper directions to achieve the twisted nematic state at room temperatures. One glass substrate is rubbed in a first direction and the second glass substrate is rubbed in a perpendicular direction to the first substrate. This rubbing step can be a source for errors that would reduce the yield in a manufacturing process.

The present embodiment replaces the glass substrates with stretched PVA substrates. The advantage of this design is that stretched PVA provides a sufficient surface for alignment of the LC molecules without rubbing. Therefore to fabricate a micropol using the method described above in which the glass is replaced by stretched PVA would require at least four less processing steps (application of the polyimide substrate one, application of the polyimide to substrate two, buffing the first substrate, and buffing the second substrate). FIG. 12 illustrates a schematic diagram of the micropol 1200 resulting from this process. Both substrates 1202 and 1204 comprise stretched PVA with liquid crystal material in a TN state 1204 and liquid crystal material in an isotropic state 1206 in between the two substrates.

This embodiment outlines an alternative method for making TN μPol by the two-step UV exposure method by using stretched PVA film to replace of the glass substrate and other plastic film substrates as described above. The substrate is a stretched PVA film laminated on a birefringent plastic film. The liquid crystal can be aligned on the surface of the stretched PVA film, just like the LC aligned on the surface of rubbed polyimide. The method involves the following steps as outline in Table II:

TABLE II

Fabrication Steps for Dual PVA Substrate TN-Micropol

1. Clean the stretched PVA film (substrate) by 2-propanol in an ultrasonic tank for 30 seconds;
2. Spray spacers on the surface of the film (the density of the spaces is 50 to 200/sq. mm., each spacer having a diameter range of 5 to 20 μm).
3. Make a cell with the two sheets of the film in such a way that the stretching direction of one sheet is orthogonal to the other, then fill in polymerizable twisted nematic LC (TNLC), or using a roller machine to laminate the LC between the two sheets;
4. Cover the cell with the micropol pattern mask. Ensure that the direction of the horizontal rows is oriented 45° with respect to the stretching direction and rubbing directions;
5. Put the cell and the mask into pressing machine that can make the cell and the mask closed completely and control the cell thickness well;
6. Use UV light (2000-3000 mj. per sq. cm.) to polymerize the TNLC under the transparent area into a permanent TN texture;
7. Remove the mask;
8. Heat the cell higher than the nematic-isotropic transition temperature so that those unpolymerized LC covered by opaque mask strips experience a transition into the isotropic phase;
9. Use UV light (2000-3000 mj. per sq. cm.) to polymerize the uncured LC at isotropic phase.

In addition to reducing the number of steps, using stretched PVA substrates affords the possibility of constructing micropols using a continuous web process. The advantage of using a web process or a batch process is the potential for much lower cost per unit and higher volume and yield. TN-micropol material can be stored and shipped in rolls to LCD manufacturers for application to their displays at their factories.

FIG. 12 shows a cross-sectional diagram of the dual PVA substrate micropol. In this case the glass substrates described above and in the '871 TN-micropol application are replaced by stretched PVA film substrate. The advantage of using stretched PVA is that since LC molecules readily line up along the stretching direction of the PVA film, there is no need for steps to coat the substrate with polyimide and to buff the polyimide in the direction of desired LC alignment. Thus using stretched PVA instead of glass reduces the number of process steps for fabrication.

The preferred method for fabrication the dual PVA substrate cell is the two-step UV exposure method described above and as described in the previous TN-micropol application. However variations on the multiple-rubbing direction and photo-induced alignment methods may also be possible. The E-Field alignment method applies only for glass substrates with patterned ITO coatings and is therefore not applicable for this micropol design. It is also preferable to use methods that employ polymerizable liquid crystal since the product contains no liquid, which precludes the possibility for leaks.

TN-Micropol Fabrication Using Passive Linear Polarizer Substrate

An alternate of the TN-micropol embodiment described above uses a passive linear polarizer as one substrate of the patterned TN-liquid crystal cell as shown in FIG. 13. Using a linear polarizer as one substrate requires a modification to the process described in the previous section but yields a micropol that is more readily usable to the LCD industry. The process for fabricating a TN-micropol with stretched PVA and passive linear polarizers is outlined in Table III below.

TABLE III

Fabrication Steps for PVA-Polarizer Substrate TN-Micropol

1. Clean the linear polarizer film with 2-propanol in an ultrasonic tank for 30 seconds
2. Buff the linear polarizing film with a felt roller
3. Clean the stretched PVA film with 2-propanol in an ultrasonic tank for 30 seconds
4. Spray spacers on the surface of the PVA film (spacer diameter 5-20 μm) (spacer density 5-200/sq. mm.
5. Make a cell with the one sheets of the PVA film and one sheet of the polarizer film in such a way that the stretching direction of the PVA sheet is orthogonal to the rubbing direction of the polarizing film, then fill in polymerizable twisted nematic LC (TNLC), or using a roller machine to laminate the LC between the two sheets;
6. Cover the cell with the micropol pattern mask. Ensure the direction of the horizontal rows is oriented 45° with respect to the stretching direction and rubbing directions;
7. Put the cell and the mask into pressing machine that can make the cell and the mask closed completely and control the cell thickness well;
8. Using a UV light (2000-3000 mj/sq. cm.) to polymerize the TNLC under the transparent area into a permanent TN texture;
9. Remove the mask;
10. Heat the cell higher then the nematic-isotropic transition temperature so that those un-polymerized LC covered by opaque mask strips experience a transition into the isotropic phase.
11. Finally using the UV (2000-3000 mj/sq. cm.) light to polymerize the uncured LC at isotropic phase.

The resulting TN cell is a flexible thin layered polarizing film that could be applied directly to an LC display at the time of its manufacture and replaces the polarizing film currently used by LC display manufacturers. The process for construction of such a TN-micropol structure depends upon which of the four methods described above and in the '871 application is chosen.

As in the previous case an advantage of this method is that TN-micropol can be fabricated in large sheets or rolls and adhered to the LC display and the reduced time of its manufacture. This structure replaces the normal analyzer (polarizer used on the output of the display). Anti-glare measures may be used on the PVA substrate of this micropol structure to reduce glare as is done on a regular LC display.

FIG. 13 illustrates a cross-sectional diagram of the PVA-Polarizer substrate TN-Micropol. The diagram is exactly the same as previously described except that a plastic linear polarizing sheet replaces the bottom PVA substrate. The exposed surface of the linear polarizer is typically a non-birefringent protective layer. In the two-step UV exposure method described above, this protective layer is buffed using a felt roller to provide a uniform alignment direction for the liquid crystal molecules.

After the main portion of the micropol cell is fabricated (as shown in the figure), an adhesive layer may be applied to the exposed side of the polarizer film to help facilitate application to LCD displays.

TN-Micropol Fabrication Using Dual Non-Birefringent Plastic Sheet Substrate

The TN-micropol can be made by two-step UV exposure method by dual non-birefringment plastic film to replace of the glass substrate. The advantage of this procedure is that can create large and continuous production line and TN micropol quality will be good because there is no any defect stripes in the isotropic phase come from material birefringent character or stretch character like PVA. It can laminate polymerizable twisted nematic liquid crystal between two roll of non-birefringent plastic film, the film must be rubbed first and rubbing direction is perpendicular each other. An additional more advantage is that there is no coating procedure with polyimide, as compared with using a glass substrate procedure. Then it can make TN-micropol by two-step UV exposure method as described above. The method involves the procedure in Table IV.

TABLE IV

Fabrication Steps for Dual Non-Birefringent Sheet Substrate TN-Micropol

1. Clean the surface of non-birefringent plastic film.
2. Rubbing the surface of the films.
3. Spray spacers on the surface of the film.
4. Make a cell with two non-birefringent film which have rubbing direction perpendicular each other. Then fill in or laminate polymerizable twisted nematic LC between the two films.
5. Put the micropol pattern mask on the top of cell, Ensure the direction of the horizontal rows is oriented 45° with respect to the rubbing direction.
6. Put the cell and the mask into a pressing machine that can make the cell and mask closed completely and control the cell thickness well.
7. Using UV light to polymerize the TNLC under the transparent area into a permanent TN texture.
8. Remove the mask.
9. Heat the cell higher than the nematic-isotropic transition temperature so that those un-polymerized LC covered by opaque mask strips experience a transition into the isotropic phase.
10. Using UV light to polymerize the uncured LC at isotropic phase.
11. Quality checking.

Fabricating A TN-Micropol Directly on the LCE

As described above it may be advantageous to fabricate the PVA-Polarizer substrate TN-micropol directly on the LC display using the polarizer of the LC display itself as one substrate and a PVA layer as the second substrate. As in the previous method variation of the two-step UV exposure method is used to make the TN-micropol directly on the display. The advantage of this method is that the micropol can be accurately constructed on the display as an additional step in the LC display manufacturing process.

FIG. 15 illustrates the concept of fabricating the PVA-substrate micropol directly on a LC display. The structure of the micropol itself is identical to the PVA-polarizer substrate version previously described. The figure shows the structure of the micropol super-imposed over a cross-sectional view of an LCD display. The polarizer of the display serves as the second substrate of the micropol, which is fabricated according to the method described above.

TN-Micropol Types

In addition to the processes used to make the TN-micropol there are several types of TN-micropols that are covered by this invention including:

Two-Substrate type: In this case the micropol uses two glass substrates and non-polymerizable LC material. The advantage is that lower cost LC can be used.

Variation 1: both glass substrates are the same thickness

Variation 2: the glass substrate closest to the display is made thinner to increase the viewing angle by reducing the parallax effect.

Single-Substrate type: polymerizable LC material is used to so that one substrate can be removed. Removing the substrate increases the viewing angle by reducing the distance between the TN-material and the active elements of the display.

Electrically switchable type: Using the E-field manufacturing process the micropol can be constructed to switch between 2D and 3D. When no electric fields is applied, the entire micropol acts as a singe LC cell causing all of the light from the display to be rotated by 90°. When the electric field is applied, the LC material between the patterned ITO electrodes enters the homeotropic phase and therefore do not rotate the polarization angle. A user can switch between 2D and 3D modes by activating a switch that controls the electric field.

Variation of E-Field Process

A variation of the E-field process would use polymerizable liquid crystal to fabricate the micropol as follows:

Perform the previously described steps to make the cell.

Fill the cell with polynerizable LC material.

Apply the E-field to cause LC material between ITO electrodes to enter the homeotropic phase.

Cure the polymerizable LC material using strong UV radiation.

Release the e-field.

Post processing and cleanup.

This method may be used to make the Single-Substrate type TN micropol.

45-Degree TN Micropol

The existing application pertains to a 0°-90° TN-micropol in which alternating lines rotate the polarization angle by either 0° or 90°. Another type of micropol can be constructed using all of the methods presented above in which alternating lines rotate the polarization angle by either −45° or +45°. A representative drawing is shown in FIG. 15. Vertically polarized light enters from behind the micropol and is rotated to −45° or +45° depending on the row.

Finally it should be noted that the micropol lines could be oriented either vertically or horizontally. When horizontal lines are used, the micropol is positioned to exactly line up over horizontal lines of the display. When vertical lines are used, the micropol is positions such that it lines up exactly over the vertical columns of the display. Furthermore, the micropol line pitch may also be designed to coincide with vertical columns of red, green, and blue pixel elements of the display. Finally the TN micropol may be designed in a checkerboard pattern. These variations are shown in FIGS. 15 to 18.

The following additional references may be relevant to the disclosure and application and are hereby incorporated by reference. U.S. Pat. Nos. 5,537,144 and 5,844,717 issued to Sadeg Faris. An article by S. M. Faris, in the SID 91 Digest, p. 840. An article by B. Bahadur, entitled Liquid Crystals Applications and Uses, published by World Scientific, 1990, p 232. A book by P. G. DE Gennes, entitled The Physics of Liquid Crystals, published by Clearendon Press Oxford, 1993. An article by T. Y. Marusii and Y. A. Reznikov in Mol. Mat., Vol. 3, p. 161, 1993. An article by M. Schadt, H. Seiberle and A. Schuster, in Nature, Vol. 381, p. 212, 1996. An article by S. C. Jain and H. S. Kitzerrow, Appl. Phys. Lett. 64 (22), p. 2946, 1994. An article by W. M. Gibbons, P. J. Shannon, S. T. Sun and B. J. Swetlin, Nature, Vol 351, p. 49, 1991. An article by G. P. Bryan-Brown and I. C. Sage, Liquid Crystals, Vol. 20, No. 6, p. 825, 1996. An article by K. Aoki, American Chemical Society, Vol. 8, p. 1014, 1992. An article by M. Schadt, H. Seiberle, A. Schuster and S. M. Kelly, Jpn. J. Appl. Phys., Vol. 34, p. L764, 1995.

While the invention has been described with reference to preferred embodiments, it will be understood by those skilled in the art that various changes may be made and equivalents may be substituted for elements thereof without departing from the scope of the invention. In addition many modifications may be made to adapt a particular situation or material to the teachings of this invention without departing from the essential scope thereof. Therefore it is intended that the invention not be limited to the particular embodiments disclosed as the best mode contemplated for this invention, but that the invention will include all embodiments falling with the scope of the appended claims.

What is claimed is:

1. A method for creating a micropolarizer, comprising:
providing a first film comprising a linear polarizer film having a first and a second surface;
providing a second film comprising a stretched PVA;
cleaning said linear polarizer film with 2-propanol within an ultrasonic tank;
buffing said linear polarizer film with a felt roller;
cleaning said stretched PVA film with 2-propanol within an ultrasonic tank;
spraying spacers on a first surface of said PVA film;
making a cell with said sheet of PVA film and said sheet of said linear polarizer film in such a way that a stretching direction of said PVA film is orthogonal to a rubbing direction of said linear polarizer;
placing polymerizable twisted nematic liquid crystal (TNLC) between said two sheets;
covering said cell with a micropolarizer pattern mask;
ensuring a direction of horizontal rows is oriented 45° with respect to said stretching direction and rubbing directions;
placing said cell and said mask into a pressing machine to make said cell and said mask closed completely;
controlling a thickness of said cell;
polymerizing the TNLC under the transparent area with UV light into a permanent TN texture;
removing said mask;
heating the cell higher than a nematic-isotropic transition temperature so that unpolymerized LC covered by opaque strips of said mask experience a transition into an isotopic phase; and
using UV light to polymerize uncured LC material at isotropic phase.

2. The method of claim 1, wherein said mask has alternate transparent and opaque strips covering said cell or film whereby a solidifying energy is being selectively applied there through; and partially solidifying some portions of said liquid cqstal.

3. The method of claim 1 wherein a density of said spacers is 50 to 200 sq·mm.

4. The method of claim 1 wherein said spacers have a diameter range of 5 to 20 pm.

5. The method of claim 1 comprising using a roller machine to laminate said LC between said two sheets as an alternative to filling in said polyrnerizable twisted nematic liquid crystal.

6. The method of claim 1, wherein said liquid crystal comprises a nematic liquid crystal.

7. The method of claim 6, wherein said nematic liquid crystal comprises a type of polymerizable nematic liquid crystal.

8. A liquid crystal display device, comprising:
an input surface for receiving incident light;
an output surface for emanating a processed light; and
a micropolarizer based on twisted nematic liquid crystals produced by a method comprising a liquid crystal display device produced by the method described substantially by claim 1.

9. A method for creating a micropolarizer, comprising:
providing a first film comprising a linear polarizer film having a first and a second surface, said first film having a rubbing direction;
providing a second film having a stretching direction;
spraying spacers on a first surface of said second film;
making a cell with said second film and said first film wherein the stretching direction of said second film is orthogonal to the rubbing direction of said first film;
placing polymerizable twisted nematic liquid crystal between said two films;
covering said cell with a micropolarizer pattern mask;
polymerizing the twisted nematic liquid crystal under the transparent area with UV light into a permanent TN texture;
removing said mask;
heating the cell higher than a nematic-isotropic transition temperature so that unpolymerized LC covered by opaque strips of said mask experience a transition into an isotropic phase; and
using UV light to polymerize uncured LC material at isotropic phase.

10. A liquid crystal display device, comprising:
an input surface for receiving incident light;
an output surface for emanating a processed light; and
a micropolarizer based on twisted nematic liquid crystals produced by a method comprising a liquid crystal display device produced by the method described substantially by claim 9.

* * * * *